Figure 1:
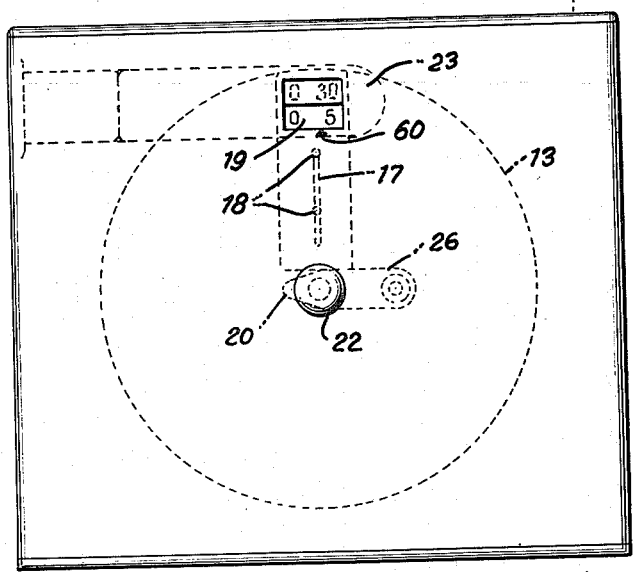

Feb. 5, 1946.  W. C. BLAISDELL  2,394,286
INTERVAL METER
Filed Jan. 24, 1942  3 Sheets-Sheet 1

INVENTOR
Willard C. Blaisdell
BY
Hastings W. Baker
ATTY.

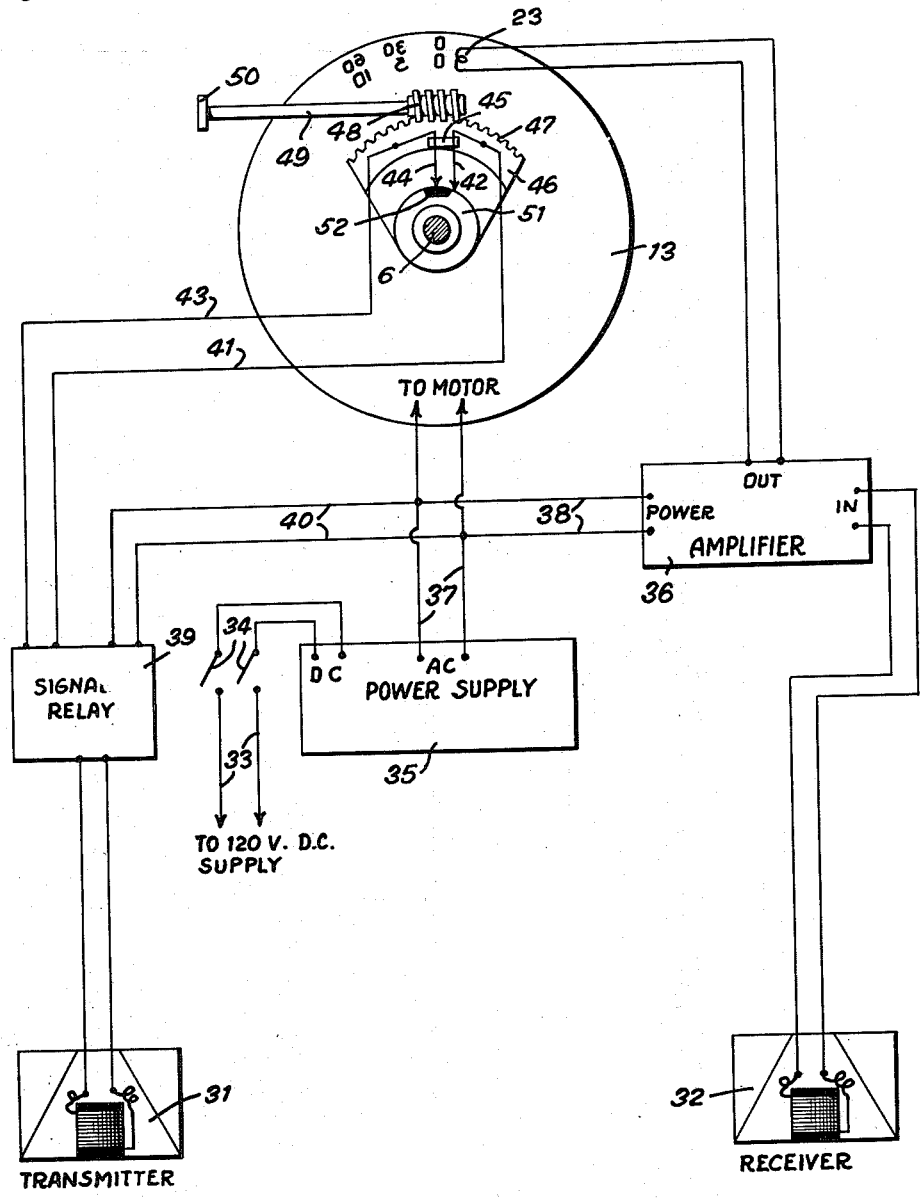

Feb. 5, 1946. W. C. BLAISDELL 2,394,286
INTERVAL METER
Filed Jan. 24, 1942 3 Sheets-Sheet 3

INVENTOR
Willard C. Blaisdell
BY
Hastings W. Baker
ATTY.

Patented Feb. 5, 1946

2,394,286

UNITED STATES PATENT OFFICE 2,394,286

INTERVAL METER

Willard C. Blaisdell, Elizabeth, N. J., assignor to National-Simplex-Bludworth, Inc., a corporation of Delaware Application January 24, 1942, Serial No. 428,078

4 Claims. (Cl. 161—15)

Various types of interval meters have heretofore been suggested. One familiar form of interval meter comprises a lamp rotatable over a dial and means to illuminate the light at the end of the interval. The position of the light relative to the scale shows the elapsed period of time. Another idea heretofore suggested is a rising column of light, the height of which, when illuminated at the end of the interval of time, represents the interval being measured.

In the present invention I employ a lamp which is illuminated at the end of the interval of time being measured, and the light from this lamp shines through a rotating translucent dial or scale, the lamp being illuminated for such a minute portion of a second that the numerals on the translucent scale give a stroboscopic effect. The numerals on the dial or scale appear in fact to stand still if the time interval being measured remains constant. If the time interval being measured should vary, the figures on the translucent scale will likewise vary, but the reading would always be clear. Suppose, for instance, the light should burn for $1/30,000$ part of a second and the scale rotated 720 R. P. M., and suppose further that the circumference of the scale was 6 feet. It is obvious that any numeral which might be illuminated for the $1/30,000$ part of a second would move less than .03 of an inch during the time it was illuminated. The numeral would, therefore, appear to be clear and with no apparent streaked effect.

Another object of the invention is to provide a plurality of scales with means to shift from one scale to the other. Another object of the invention is to provide a change speed motor, the speed of which is changed simultaneously with the change from one scale to the other scale.

Another object of the invention is to provide means to compensate for various factors, such as the depth of a vessel in water, the temperature of the water and its salinity.

Still another object of the invention is to provide an indicator which may be read in combination with a recorder. Other objects or advantages of the invention will appear in the detailed specification and claims which follow:

The invention may be better understood by referring to the drawings in which

Figure 3:
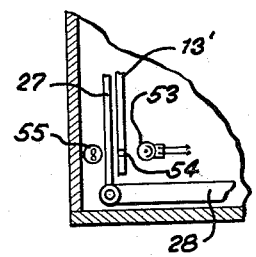
Figure 2:
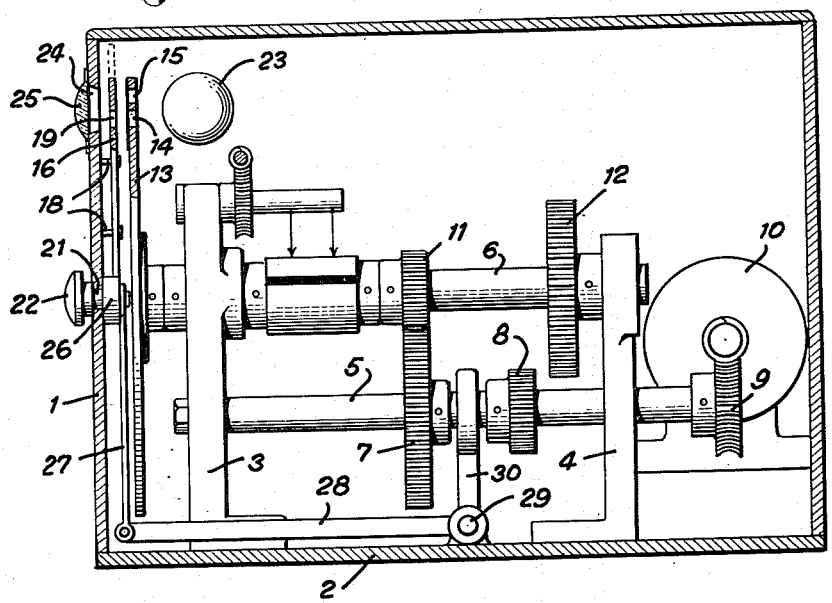
Figure 5:
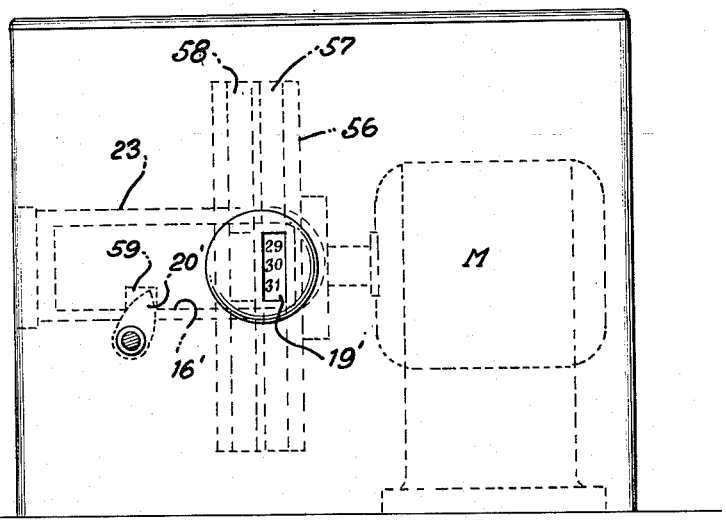
Figure 6:
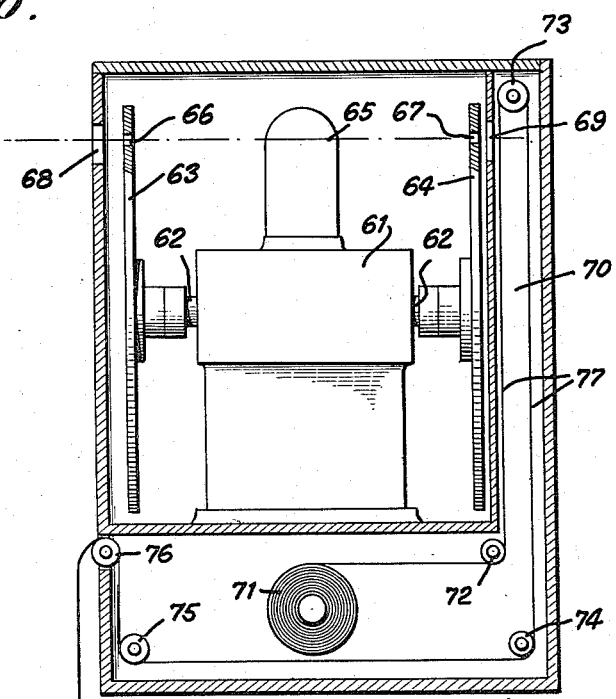

Figure 1 is a front elevational view of my improved indicator,

Figure 2 is a side, cross-sectional view on the line 2—2 of Figure 1 looking in the direction of the arrows, Figure 3 is a modification of the means to control the signal transmitter, Figure 4 is a diagrammatic view of the circuits employed and the means to vary the timing of the sending signal, Figure 5 is a modification of the structure shown in Figure 1, and Figure 6 is a view similar to Figure 2 and showing the recorder incorporated with the indicator.

Referring to Figures 1 and 2, the housing includes a front wall 1 and a bottom 2. The bottom 2 supports uprights 3 and 4, and the shafts 5 and 6 are supported by these uprights. Splined to shaft 5 is the gear 7 and the pinion 8, and secured to shaft 5 is the drive worm gear 9 driven by the constant speed motor 10. Secured to the shaft 6 is the pinion 11 and the gear 12. These gears are simply change speed gears, so that when the gear 7 drives the pinion 11, the shaft 6 is rotated at a higher speed than it would be rotated when the pinion 8 drives the gear 12. Secured to the front end of the shaft 6 is a disk 13 provided with two translucent circular scales 14 and 15. Numerals on these translucent scales start at a common or zero point. The scale 14 may be called the high speed scale, and the scale 15 may be called the low speed scale.

A sliding shutter 16 is provided with a vertically extending slot 17 which receives guide pins 18 carried by the front wall 1. The shutter 16 is provided with an opening 19 which may be covered with transparent material if desired. The shutter 16 overlies a cam 20 carried by a shaft 21 extending through the front wall 1 and terminating in a hand knob 22, which is accessible to the operator. When the shutter 16 is in the position shown in Figures 1 and 2, the opening 19 is in front of the lower scale 14 and light from the stroboscopic lamp 23 will shine through the translucent scale 14, and opening 19 when the lamp is illuminated. If, however, the hand knob 22 be rotated so that the cam 20 moves the shutter to its upper position, the light, when illuminated, will pass through the translucent scale 15 and through the opening 19, the opening 19 being now positioned adjacent the scale 15. The front wall 1 is provided with an opening 24 which may be covered with transparent material or, preferably, a magnifying glass 25 may cover the opening 24 so that the numerals appearing on the scales 14 and 15 may be enlarged. A reading point notch or line 60 may be placed on the front wall or the magnifying glass.

The shaft 21 also carries an arm 26 connected to a rod 27, which, at its lower end, is connected to a bell crank lever 28 pivoted at 29 to the bottom wall 2. This bell crank lever has an upwardly extending arm 30 adapted to move the gear 7 and pinion 8 into or out of mesh with their respective pinion and gear, that is, to control the change speed gearing, as is well understood in the art. It will, therefore, be apparent that when the operator changes the gearing he simultaneously moves the sliding shutter, so as to expose the proper scale. It is apparent that the scale 14 is the scale that would be employed when the gear 7 drives the pinion 11, and the scale 15 is the scale that would be employed when the pinion 8 drives the gear 12. It is, therefore, impossible for the motor to be driving at one speed and for the wrong scale to appear.

When the interval meter is used to determine distances by the echo method, a signal may be sent out by a transmitter 31, which signal travels to the object which sends back an echo, which is picked up by the receiver 32. The interval of time between the time the signal is sent by the transmitter 31 and is received by the receiver 32, is a function of the distance which is being measured.

As, or shortly after, the disk 13 passes its zero point, the transmitter 31 is energized, as will hereinafter be explained, and when the receiver 32 picks up the echo, the lamp 23 is illuminated for an exceedingly brief interval of time, so that the light therefrom passes through the translucent part of the scale on the disk 13 to indicate the depth of water or the distance to the object sending back the echo.

Power from the supply means 33 is fed through the main power switch 34 into the power supply 35. The alternating current power from the power supply 35 extends to the amplifier 36 through leads 37 and 38. The leads 37 extend to the motor 10 and also to the signal relay 39 by means of leads 40. A lead 41 extends from the signal relay to a brush 42. A lead 43 extends from a brush 44 to the signal relay 39. The brushes 42 and 44 are carried by a brush holder 45, which is carried by the segmental disk 46 rotatably mounted on the shaft 6. The disk 46 is provided with gear teeth 47 which are engaged by the worm 48 on shaft 49, which may be adjusted by the operator by means of the knob 50. Fibre drum 51 is rigidly secured to the indicator disk 13 and carries a bronze shorting segment, the fibre drum serving as an insulation. When the brushes 42 and 44 are closed by means of the shorting segment 52, the signal relay 39 releases its power to the transmitter 31. The signal now travels to the object which will reflect the echo, and the receiver picks up the echo, transmitting it to the amplifier 36 and thence to the light 23.

By shifting the brushes 42 and 44 circumferentially by rotating the knob 50, adjustment may be made for the draft of the vessel, or for tide, or any other corrective factors.

In Figure 3 I have shown a modification in which a photoelectric cell 53 is connected to the signal relay 39. The disk 13' is similar to the disk 13 except that it is provided with a hole 54 behind a continuously burning lamp 55. When the disk 13' has rotated so that the hole 54 is between the light 55 and the cell 53, the rays from the light 55 pass through the hole 54 energizing the cell 53 which, in turn, controls the signal relay 39 and the transmitter 31. It will, of course, be understood that the parts are so positioned that the signal will be transmitted to the transmitter at the zero position of the disk 13' or at the position corresponding to its adjusted zero position, if it is desired to take into consideration the draft of the vessel and other correction factors.

In the modification shown in Figure 5, instead of the disk 13 I have provided a drum 56 rotated by the motor. This drum has scales 57 and 58 thereon corresponding to the scales 14 and 15. The lamp 23 projects into the drum so that when the lamp 23 is illuminated at the time of the receipt of the echo, the light will pass through the translucent scales 57 and 58 for an exceedingly brief interval of time, such as $1/30{,}000$ part of a second. In order that only one scale may be read, a slide 16' is provided having a window 19' which may be positioned in front of either of said scales by means of the cam 20', which cam projects into a notch 59 in said slide. The cam 20' is manually operated in the same manner as is the cam 20.

As shown in Figures 1 and 5, the window is long enough for at least two numerals to appear, although this is not absolutely essential. It is preferable, however, to have the window sufficiently long so as to insure that one number will always appear behind it in reading position.

In the modification shown in Figure 6, a driving means 61, which may be of the same type as shown in Figure 2, is employed but instead of driving one disk, it drives a shaft 62 which extends through the driving means and has a front disk 63 and a rear disk 64, each of which may be similar to the disk 13 and provided with either one or a plurality of scales. A shutter such as the shutter 16 may be employed or, as shown in Figure 6, it may be eliminated. A stroboscopic lamp 65 is employed between the disks, and when it is illuminated at the end of the time interval, such as when the echo is received, its light passes through the translucent scales 66 and 67 and through the windows 68 and 69 in the front and rear walls respectively. The scale 66 would of course be read through the window 68, as heretofore described.

In the rear portion of the housing is a dark chamber 70, through which photographic film 77 passes from the supply roller 71 under the guide roller 72 and thence upwardly over a guide roller 73, under guide rollers 74 and 75 and over guide roller 76. As the film passes to the rear of the window 69, a picture of the numerals on the scale 67 will be made on the said film when the light 65 flashes. The negative will then travel downwardly to the lower portion of the housing beneath the rollers 74 and 75 where it will be developed, and after passing out of the housing over the roller 76, it may be read by the operator as a permanent record.

It is of course realized that many changes may be made in the invention shown by way of illustration herein. For instance, the indicators 14 and 15 may be made of translucent material with the figures opaque, or the scale may be opaque with the figures translucent, the essential point being that one or the other is translucent so as to make a contrast so that the figures may be read. I contemplate either construction when I call my scale a transparent or a translucent one. It is furthermore obvious that one of the scales might be one color and the other, another color. This arrangement is entirely optional. As heretofore explained, the light burns for only a minute fraction of a second, possibly $1/30{,}000$ part of a second. During this interval the numeral which is illuminated moves so slightly that its movement cannot be detected, and the figure appears to stand out clear and distinct and is apparently motionless. I have therefore termed this light a stroboscopic light.

Having now described my invention I claim:

1. In an interval meter, a rotatable member having a slow speed and a fast speed indicator thereon, change speed mechanism to drive the said member at slow or high speed, a shutter having a window therein through which one and only one of said indicators may be read when illuminated, means to shift the shutter so that the window will be in position to expose the slow speed shutter and to change the change speed mechanism so that the member will be driven at slow speed and vice versa, and means to illuminate the indicator stroboscopically at the end of a time interval.

2. In an interval meter, a rotatable member having a slow speed and a fast speed indicator thereon, speed control means to drive said member at either slow speed or fast speed, a shiftable shutter having a window therein through which either of said indicators may be viewed, a common means to control said shutter and said speed control means, and means to illuminate the indicator stroboscopically at the end of a time interval.

3. In an interval meter, a rotatable member having a slow speed and a fast speed indicator thereon, a slow speed and a fast speed driving means for said member, a shiftable shutter having a window therein, control means to shift said shutter so that the window will be positioned so that either the slow speed or the fast speed indicator may be read through the window while illuminated, said control means simultaneously shifting said driving means so that the slow speed driving means will be operated when the slow speed indicator is uncovered by the window and so that the high speed driving means will be operated when the high speed indicator is uncovered by the window, and means to illuminate the indicator stroboscopically at the end of a time interval.

4. In an interval meter, a rotatable member having a high speed and a slow speed indicator thereon, shiftable means to obscure either of said indicators and to uncover the other indicator, change speed gearing to drive said member at either high or slow speed, a common control for said shiftable means and said change speed gearing, and means to illuminate the selected indicator stroboscopically at the end of a time interval.

WILLARD C. BLAISDELL.